(12) United States Patent
Kosuru et al.

(10) Patent No.: US 10,545,939 B2
(45) Date of Patent: Jan. 28, 2020

(54) MULTI-COLUMN STATISTIC GENERATION OF A MULTI-DIMENSIONAL TREE

(71) Applicant: Hewlett Packard Enterprise Development LP, Houston, TX (US)

(72) Inventors: Ramakumar Kosuru, Austin, TX (US); Kailash Sati, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 395 days.

(21) Appl. No.: 15/114,363

(22) PCT Filed: Jan. 29, 2014

(86) PCT No.: PCT/US2014/013528
§ 371 (c)(1),
(2) Date: Jul. 26, 2016

(87) PCT Pub. No.: WO2015/116054
PCT Pub. Date: Aug. 6, 2015

(65) Prior Publication Data
US 2017/0011083 A1 Jan. 12, 2017

(51) Int. Cl.
*G06F 7/00* (2006.01)
*G06F 17/30* (2006.01)
*G06F 16/22* (2019.01)
*G06F 16/28* (2019.01)

(52) U.S. Cl.
CPC .......... *G06F 16/2246* (2019.01); *G06F 16/28* (2019.01)

(58) Field of Classification Search
CPC ......... G06F 17/30327; G06F 17/30587; G06F 17/30336; G06F 16/2246; G06F 16/28; G06F 16/283
USPC .......................... 707/741, 797, 803, 737, 792
See application file for complete search history.

(56) References Cited

U.S. PATENT DOCUMENTS

| 5,983,224 A | 11/1999 | Singh et al. |
| 6,272,487 B1 | 8/2001 | Beavin et al. |
| 6,859,455 B1 * | 2/2005 | Yazdani ............ G06F 17/30985 370/392 |

(Continued)

OTHER PUBLICATIONS

Derthick, M. et al.; Efficient Multi-object Dynamic Query Histograms; Jan. 1, 1999, 9 Pgs., http://repository.cmu.edu/cgi/viewcontent.cgi?article=1030&context=hcii >.

(Continued)

*Primary Examiner* — Md I Uddin
(74) *Attorney, Agent, or Firm* — Hewlett Packard Enterprise Patent Department

(57) ABSTRACT

In one implementation, a system for multi-column statistic generation of a multi-dimensional tree includes a sampling engine to generate a sample of values from a set of data values, wherein the data values include multi-dimensional inputs. In addition, the system includes generating engine to generate a multi-dimensional tree utilizing the sample values. In addition, the system includes a filtering engine to determine a number of unique values at each node of the multi-dimensional tree utilizing a filter for the set of data values. Furthermore, the system includes an implementing engine to implement the multi-dimensional tree for a query of the set of data values.

13 Claims, 4 Drawing Sheets

(56) References Cited

U.S. PATENT DOCUMENTS

| | | | |
|---|---|---|---|
| 7,330,848 | B2 | 2/2008 | Chaudhuri et al. |
| 7,412,439 | B2 | 8/2008 | Bossman et al. |
| 7,428,550 | B2 | 9/2008 | Lakshminarayan et al. |
| 7,774,380 | B2 | 8/2010 | Burke et al. |
| 8,549,004 | B2 | 10/2013 | Lakshminarayan et al. |
| 2008/0201293 | A1* | 8/2008 | Grosset ............. G06F 17/30592 |
| 2012/0084287 | A1 | 4/2012 | Choudur et al. |
| 2013/0046793 | A1* | 2/2013 | Reznik ................. G06K 9/6261 707/797 |
| 2014/0006411 | A1 | 1/2014 | Boldyrev et al. |
| 2015/0007115 | A1* | 1/2015 | Kleser ................. G06F 3/0484 715/854 |

OTHER PUBLICATIONS

G. Cormode and M. Hadjieleftheriou "Finding the Frequent Items in Streams of Data", Communications of ACM, Oct. 2009, 9 Pgs.

Goetz Graefe, "Fast Loads and Fast Queries", T.B. Pedersen, M.K. Mohania, and A M. Tjoa (Eds.): DaWaK 2009, LNCS 5691, pp. 111-124, 2009.

Huang, Y.; Fast Edge-preserving/-aware High Dimensional Filters for Image & Video Processing; Oct. 24, 2013, 4 Pgs., http://www.slideshare.net/yuhuang/fast-edge-preservingaware-high-dimensional-filters-for-image-video-processing >.

International Searching Authority, The International Search Report and the Written Opinion, dated Oct. 24, 2014, 9 Pages.

Lang, D.; Astrometry.net: Automatic Recognition and Calibration of Astronomical Images; http://www.astro.princeton.edu/~dstn/lang-thesis.pdf >; Nov. 5, 2009, 173 Pgs.

M. Mitzenmacher and Eli Upfal, "Probability and Computing: Randomized Algorithms and Probabilistic Analysis", pp. 109-111, Cambridge Press, 2005.

P. Flajolet and G. Nigel Martin, Probabilistic Counting Algorithms for Database applications, Journal of Computer and System Sciences, vol. 31, Oct. 1985, pp. 182-209.

Panigrahy, R.; Hashing, Searching, Sketching; http://research.microsoft.com/pubs/74010/thestemplate.pdf; Dec. 2006, 154 Pgs.

Peter K. Pearson, "Fast Hashing of Variable Length Text Strings", Jun. 1990 vol. 33, CACM, pp. 677-680.

Zhang, X. et al.; An Efficient Multi-Dimensional Index for Cloud Data Management; http://idke.ruc.edu.cn/reports/report2009/Selected%20Papers/1.pdf >; Nov. 2, 2009.

* cited by examiner

| LEVEL | DIMENSION | BINARY DECISION |
|---|---|---|
| 0 | x | GO LEFT IF $x <= x_0$ ELSE GO RIGHT |
| 1 | y | GO LEFT IF $y <= y_1$ ELSE GO RIGHT |
| 2 | x | GO LEFT IF $x <= x_2$ ELSE GO RIGHT |
| 3 | y | GO LEFT IF $y <= y_3$ ELSE GO RIGHT |

330

(1,2), (2,4), (1,3), (6,9), (6,3), (5,1), (7,5), (4,3), (1,8), (7,8)  ~332

336 → (4,3)
338 → (1,2)  (6,9)
340 → (2,4) (5,1) (7,5)
342 → (1,3)  (7,4) (4,8)
344 → (1,8)

334

MULTI-COLUMN STATISTIC GENERATION OF A MULTI-DIMENSIONAL TREE

BACKGROUND

An SQL optimizer can utilize a variety of statistics to analyze a user query and/or in optimizing possible query plans. In some cases, there can be an assumption when determining a possible query plan that there is a single column statistic. In some cases, the assumption that a single column statistic is utilized can simplify the determination of the possible query plan.

DETAILED DESCRIPTION

A set of data values (e.g., query data, log data, numerical data, multi-column data, etc.) can be stored in a database (e.g., computer readable memory, etc.). A sample (e.g., sample set, sample set of values, a portion of data values from the set of data values, a number of selected data values from the set of data values, etc.) can be generated from the set of data values. The sample can be utilized to generate a multi-dimensional tree. The multi-dimensional tree can be a representation of a plurality of data values with a plurality of levels and/or dimensions. Generating the multi-dimensional tree can include assigning a value from the sample as a root value (e.g., root node, etc.).

Generating the multi-dimensional tree can include assigning each of the values from the sample to a position of the multi-dimensional tree based on a comparison of dimensional input values of the sample values. The dimensional input values can be a value that corresponds to a feature of a data value. That is, a data value can include multiple input values that correspond to a particular feature of the data value. For example, a data value can have dimensional input values (X, Y), where X corresponds to a first feature and Y corresponds to a second feature of the data value. The comparison of dimensional input values can determine a location (e.g., level of the multi-dimensional tree, side of the multi-dimensional tree, etc.) for each value of the sample of values with a binary decision chart as described herein. The binary decision chart can include a decision for placing a value from a data set based on a comparison of a corresponding dimensional input value of the value and any existing nodes within the multi-dimensional tree.

The generated multi-dimensional tree can be analyzed utilizing a number of counters and/or a filter (e.g., bloom filter, etc.). For example, a Bloom filter can be utilized to determine a number of unique values (e.g., unique value count (UEC), non-repeating values, etc.) at each node of the generated multi-dimensional tree and/or from the sample of values. The number of unique values can be displayed on a number of mediums (e.g., user interface, computing monitor, etc.) utilizing a graphical representation as described herein. The generated multi-dimensional tree can be utilized to predict patterns of the set of data values. For example, the generated multi-dimensional tree can be implemented for a query of the set of data values.

Figure 1:
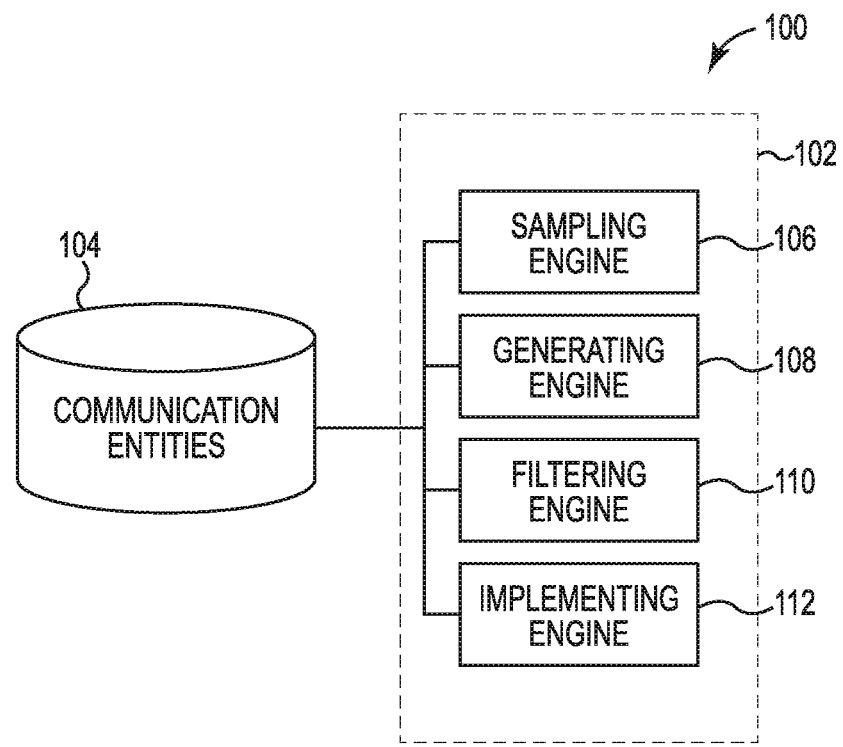
FIG. 1 illustrates a diagram of an example of a system for multi-column statistic generation of a multi-dimensional tree according to the present disclosure.
Figure 2:
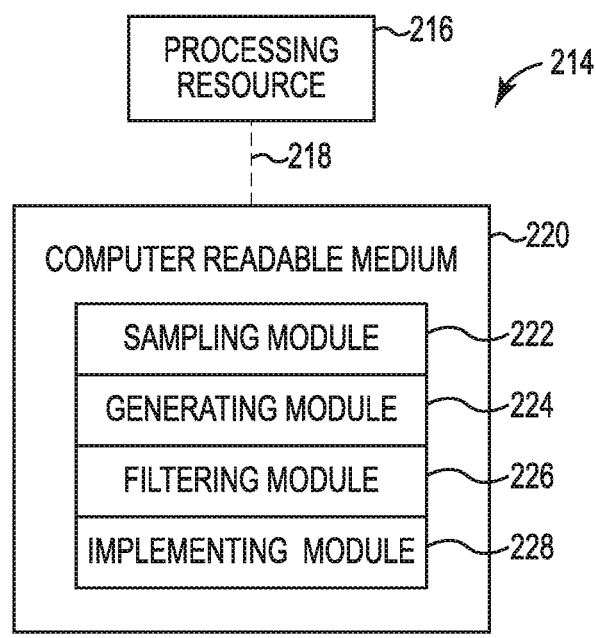
FIG. 2 illustrates a diagram of an example computing device according to the present disclosure.

FIGS. 1 and 2 illustrate examples of system 100 and computing device 214 according to the present disclosure. FIG. 1 illustrates a diagram of an example of a system 100 for multi-column statistic generation of a multi-dimensional tree according to the present disclosure. The system 100 can include a database 104, multi-dimensional tree generation system 102, and/or a number of engines 106, 108, 110, 112. The multi-dimensional tree generation system 102 can be in communication with the database 104 via a communication link, and can include the number of engines (e.g., sampling engine 106, generating engine 108, filtering engine 110, implementing engine 112). The multi-dimensional tree generation system 102 can include additional or fewer engines that illustrated to perform the various functions described herein.

The number of engines 106, 108, 110, 112 can include a combination of hardware and programming that is configured to perform a number of functions described herein (e.g., generating a sample of values from a set of data values, wherein the data values include multi-dimensional inputs, assigning a first value from the sample of values as a root value, wherein the first value includes a median dimensional input value, generating a multi-dimensional tree utilizing a comparison of dimensional input values for each value of the sample of values, wherein the dimensional input values that are compared are in the same dimension, implementing the multi-dimensional tree for a query of the set of data values, etc.). The programming can include program instructions (e.g., software, firmware, etc.) stored in a memory resource (e.g., computer readable medium, machine readable medium, etc.) as well as hard-wired program (e.g., logic).

The sampling engine 106 can include hardware and/or a combination of hardware and programming to generate a sample of values from a set of data values, wherein the data values include multi-dimensional inputs. The sample of values can include a number of values from the set of data values that can act as a representation of the entire set of data values. For example, a portion of data values from the set of data values can be selected and utilized to represent the set of data values.

The generating engine 108 can include hardware and/or a combination of hardware and programming to generate a multi-dimensional tree utilizing the sample values. The generating engine 108 can also include hardware and/or a combination of hardware and programming to assign a location (e.g., place, position of a node within the multi-dimensional tree, etc.) for each of the data values from the sample of values. The generating engine can utilize a binary decision chart to assign a location of each data value in the multi-dimensional tree.

The filtering engine 110 can include hardware and/or a combination of hardware and programming determine a number of unique values at each node of the multi-dimensional tree utilizing a filter for the set of data values. The filtering engine 110 can also include hardware and/or a combination of hardware and programming to analyze and/or organize the number of unique values to represent the multi-dimensional tree.

The implementing engine 112 can include hardware and/or a combination of hardware and programming to implement the multi-dimensional tree for a query of the set of data values. The implementing engine 112 can include hardware and/or a combination of hardware and programming to utilize the multi-dimensional tree for future query searches of the set of data values.

FIG. 2 illustrates a diagram of an example computing device 214 according to the present disclosure. The computing device 214 can utilize software, hardware, firmware, and/or logic to perform a number of functions described herein.

The computing device 214 can be any combination of hardware and program instructions configured to share information. The hardware, for example, can include a processing resource 216 and/or a memory resource 220 (e.g., computer-readable medium (CRM), machine readable medium (MRM), database, etc.). A processing resource 216, as used herein, can include any number of processors capable of executing instructions stored by a memory resource 220, Processing resource 216 may be implemented in a single device or distributed across multiple devices. The program instructions (e.g., computer readable instructions (CRI)) can include instructions stored on the memory resource 220 and executable by the processing resource 216 to implement a desired function (e.g., generating a sample of values from a set of data values, wherein the data values include multi-dimensional inputs, assigning a first value from the sample of values as a root value, wherein the first value includes a median dimensional input value, generating a multi-dimensional tree utilizing a comparison of dimensional input values for each value of the sample of values, wherein the dimensional input values that are compared are in the same dimension, implementing the multi-dimensional tree for a query of the set of data values, etc.).

The memory resource 220 can be in communication with a processing resource 216. A memory resource 220, as used herein, can include any number of memory components capable of storing instructions that can be executed by processing resource 216. Such memory resource 220 can be a non-transitory CRM or MRM. Memory resource 220 may be integrated in a single device or distributed across multiple devices. Further, memory resource 220 may be fully or partially integrated in the same device as processing resource 216 or it may be separate but accessible to that device and processing resource 216. Thus, it is noted that the computing device 214 may be implemented on a participant device, on a server device, on a collection of server devices, and/or a combination of the participant device and the server device.

The memory resource 220 can be in communication with the processing resource 216 via a communication link (e.g., a path) 218. The communication link 218 can be local or remote to a machine (e.g., a computing device) associated with the processing resource 216. Examples of a local communication link 218 can include an electronic bus internal to a machine (e.g., a computing device) where the memory resource 220 is one of volatile, non-volatile, fixed, and/or removable storage medium in communication with the processing resource 216 via the electronic bus.

A number of modules 222, 224, 226, 228 can include CRI that when executed by the processing resource 216 can perform a number of functions. The number of modules 222, 224, 226, 228 can be sub-modules of other modules. For example, the generating module 224 and the filtering module 226 can be sub-modules and/or contained within the same computing device. In another example, the number of modules 222, 224, 226, 228 can comprise individual modules at separate and distinct locations (e.g., CRM, etc.).

Each of the number of modules 222, 224, 226, 228 can include instructions that when executed by the processing resource 216 can function as a corresponding engine as described herein. For example, the sampling module 222 can include instructions that when executed by the processing resource 216 can function as the sampling engine 106. In another example, the implementing module 228 can include instructions that when executed by the processing resource 216 can function as the implementing engine 112.

Figure 3:
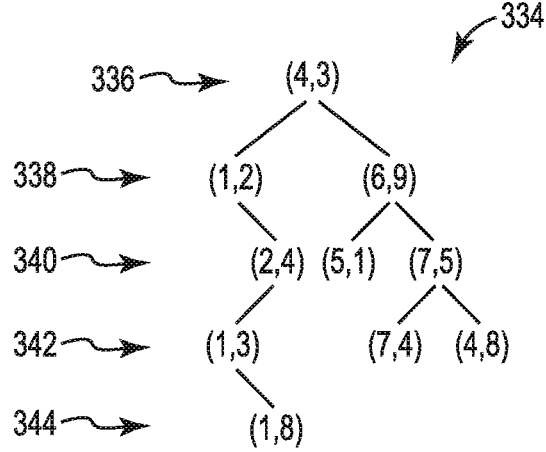
FIG. 3 is a diagram of an example of a multi-dimensional tree generation according to the present disclosure.

FIG. 3 is a diagram of an example of a multi-dimensional tree generation according to the present disclosure. FIG. 3 includes a binary decision chart 330 (e.g., binary decision table, decision table, etc.) that can be utilized to determine a position within the multi-dimensional tree for a number of values. FIG. 3 also includes a sample set of data values 332. The sample set of data values 332 (e.g., representative sample, plurality of data values, sample, sample set, sample values, etc.) can include a portion of data values from a larger data set (e.g., SQL data set within a database, plurality of data values, data set including a plurality of data inputs, etc.). As described further herein, the binary decision chart 330 can be utilized to position each of the number of values within the sample set of data values 332 into a multi-dimensional tree 334.

The multi-dimensional tree 334 generation can include determining and assigning a root node (e.g., level 0, dimension 336, etc.). The root node can be determined by comparing a particular input value (e.g., x-value, y-value, etc.) for each of the values within the sample set of data values 332. The particular input value can be a corresponding value (e.g., value that represents the same and/or similar parameter, value that represents the same and/or similar metric, etc.) for each of the values in the sample set of data values 332. For example, the sample set of data values 332 can include inputs (X,Y). In this example, the particular input value can be the X-value. That is, a first X-value of a first data value (X,Y) can be compared to a second X-value of a second data value (X',Y') within the sample set of data values.

In some embodiments, a data value that has an input value that is near the middle of the lowest input value and the highest input value within the sample data set 332 can be selected as the root node. For example, the root node can include an input value that is at or near a middle value (e.g., median, average, mean, etc.) for the sample set of data values 332. That is, the root node can be determined and/or assigned to construct a multi-dimensional tree 334 that is relatively balanced (e.g., having a relatively similar number of nodes on a first side of the root node and a second side of the root node, etc.). It can be advantageous in some embodiments to construct a multi-dimensional tree 334 to have a similar or the same number of nodes on a left side and a right side of the root node. A multi-dimensional tree 334 that includes a similar or same number of nodes on a left side and a right side of the root node can be considered a "balanced" multi-dimensional tree 334.

The binary decision chart 330 can include a number of binary decisions for each of a number of levels and/or dimensions of a multi-dimensional tree generation. For example, at a first level (e.g., level 0, level 1 etc.) the binary decision can be based on a comparison of a corresponding input value of a number of sample data values 332. The binary decision chart 330 can include a number of rules (e.g., binary decisions, "if then" statements, etc.) to determine a position for each value from the sample set of data values 332. For example, the binary decision chart 330 can include an instruction to "go left if x is less than or equal to $x_0$ and if not go right". In this example, a comparison can be made between an input value of a root node that was previously assigned and a corresponding input value of a second data value. If the input value of the second data value is less than the input value of the root node, the second data value can move to a left position child node of the multi-dimensional data tree 334 and either compared to an input value of an existing node in that position or the second data value can be assigned to that position if there is not an existing node in that position.

The binary decision chart 330 can include a binary decision for each dimension of the multi-dimensional tree 334. That is, the binary decision chart 330 can include a first binary instruction for the root node at dimension 336, a second binary instruction for children of the root node at dimension 338, and an N-binary instruction for each dimension (e.g., dimension 340, dimension 342, dimension 344, etc.). In some embodiments, the binary decision for each dimension can be the same and/or similar binary decision. That is, the same input value can be compared and the same binary decision can be applied to the comparison of the nodes and value within the sample set of data values 332 for each position. In these examples, when the data value from the sample set of data values 332 reaches a position that does not include an existing data value (e.g., existing node, etc.), the data value can be assigned to that position.

As described herein, the multi-dimensional tree 334 can be constructed based on the binary decision chart 330. An input value that will be utilized for comparison can be the X-value for data values comprising (X,Y). For example, the input value 4 can be utilized for comparing when the data value comprises (4,3). In one example, as described herein, the root node at dimension 336 can be determined and assigned. In this example, the root node that is assigned has a value of (4,3). With the root node (4,3) assigned, a different value from the sample set of values 332 can be selected and compared to the root node (4,3). In this example, value (1,2) can be selected from the sample set of values 332 and compared to the root node (4,3). In this example, the X-value of the root node (4) is compared to the X value of the selected value (1,2) (1) and a determination that the input value (1) of the selected value (1,2) is less than the input value (4) of the root node (4,3). That is, the selected value (1,2) is moved to dimension 338 to the left of the root node. In this example, there is no existing value (e.g., existing node, etc.) in the position left of the root node in dimension 338 and therefore the selected value (1,2) is assigned to the position as shown in the multi-dimensional tree 334.

Generation of the multi-dimensional tree 334 can continue in a similar manner to add the remaining values from the sample set of values 332. For example, value (2,4) can be selected and compared first to the root node (4,3). It can be determined that the input value (2) from the selected value (2,4) is less than the input value (4) of the root node (4,3). In this example, the selected value (2,4) can move to dimension 338 to the left of the root node (4,3) and be compared to value (1,2). It can be determined that the input value (4) of the selected value (2,4) is greater of the input value (2) of the value (1,2). That is, the selected value (2,4) can proceed to a position right of the value (1,2) at dimension 340 when there is no value existing at the time of the determination.

As described herein, each value within the sample set of values 332 can be assigned to a position utilizing the binary decision chart 330. The resulting multi-dimensional tree 334 of the sample set of values 332 is shown in FIG. 3. A number of additional values (e.g., hard counter values, soft counter values, random values, etc) can be assigned to the multi-dimensional tree 334 when all or a portion of the values from the sample set of values 332 are assigned to the multi-dimensional tree 334. The additional values can include counter values (e.g., hard counter values, soft counter values, etc.).

The hard counter values can include a counter that also adds nodes to the multi-dimensional tree 334. For example, a value (7,4) can be a hard counter that is added to the multi-dimensional tree 334. The value (7,4) can be assigned a position within the multi-dimensional tree 334 utilizing the binary decision chart 330. For example, the value (7,4) can be compared to the root node (4,3) and a determination can be made that the input value (7) is greater than the input value (4) of the root node (4,3), which can send the value (7,4) to a position right of the root node (4,3) at dimension 338.

At dimension 338 the input value (7) from value (7,4) can be compared to input value (9) from value (6,9). It can be determined that input value (4) from value (7,4) is less than input value (9) and value (7,4) can be sent to the left of value (6,9) at dimension 340. In addition, at dimension 340 the input value (7) from value (7,4) can be compared to input value (7) from value (7,5). It can be determined that input value (7) is equal input value (7) and value (7,4) can be sent to the left of value (7,5) at dimension 342.

The hard counter values can be added to increase a size (e.g., number of dimensions, number of nodes, number of levels, etc.) of the multi-dimensional tree 334. In addition, the hard counter values can be added to determine a quantity of data values that are located near the hard counter values. For example, the hard counter values can determine a quantity of data values that are positioned to the right and/or left of the hard counter values. That is, the hard counter values can determine a quantity of values that are within the same dimension as the hard counter value and/or determine a quantity of values that are to the right and/or left of the hard counter values within the same dimension as the hard counter value. For example, a hard counter value (7,4) can count a value (7,8) to the right within dimension 342 and a value (1,3) to the left within dimension 342.

There can also be a number of soft counter values added to the multi-dimensional tree 334. The number of soft counter values can be counters that are added to the multi-dimensional tree 334 without adding nodes to the multi-dimensional tree 334. That is, there are counters added to the multi-dimensional tree 334 that are not also acting as additional nodes within the multi-dimensional tree 334. Similar to the hard counter values, the soft counter values can determine a quantity of values that are located to the right and/or left of the soft counter values within the same dimension.

The counter values can be utilized to determine a quantity of each data value from the sample set of values 332. The quantity of each data value from the sample set of values 332 can be utilized to extrapolate the multi-dimensional tree 334. For example, the quantity of each data value from the sample set of values 332 can be utilized to predict quantities of additional values that can be assigned to additional locations of the multi-dimensional tree 334.

As described herein, the multi-dimensional tree 334 can be implemented for future query searches and/or data searches of the set of data values. That is, the multi-dimensional tree 334 can be used as a model for searching the set of data values.

Figure 4:
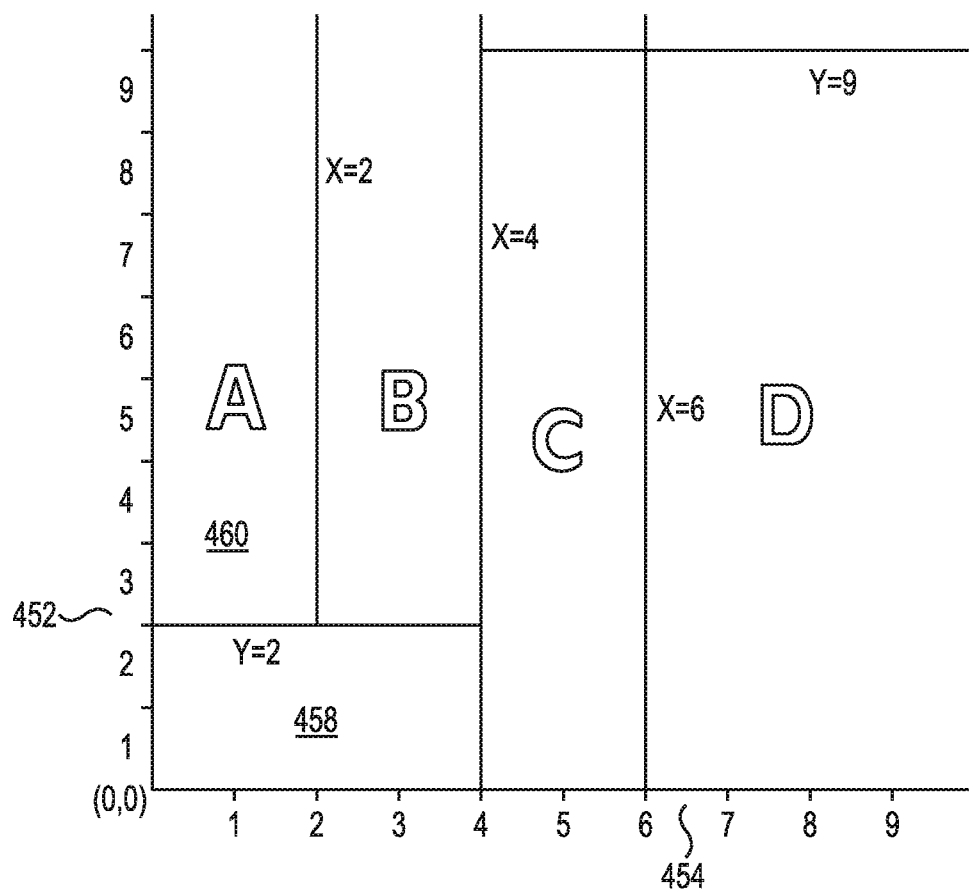
FIG. 4 is a graphical representation of examples of unique values according to the present disclosure.

FIG. 4 is a graphical representation of examples of unique values according to the present disclosure. The graphical representation can include an X-axis 454 and a Y-axis 452 to represent corresponding input values (X,Y) for a number of the data value from a sample set of values (e.g., sample set of values 332, etc.). The number of polygons can be defined by a traversal (e.g., position from the root node, etc.) from the root node.

As described herein, a filter (e.g., Bloom filter, etc.) can be utilized to determine a number of unique data values within the sample set of values and/or the constructed multi-dimensional tree (e.g., multi-dimensional tree 334, etc.). For example, a Bloom filter can be utilized to determine a quantity of unique values (e.g., unique value count, etc.) from the data values that are identified by the counter values (e.g., soft counter values, hard counter values, etc.) within a multi-dimensional tree. The Bloom filter can be a relatively small sized Bloom filter. That is, the Bloom filter can operate utilizing a relatively smaller quantity of resources compared to a size of Bloom filter utilized for larger quantity of data values.

The graphical representation can include a number of polygon constraints (e.g., polygon constraint A 460, polygon constraint B, polygon constraint 458, etc.). The number of polygon constraints can define a number of constraints to organize the number of unique values. For example, the polygon constraints can include a minimum input value, maximum input value, and/or minimum/maximum of an additional value other than the input value of the unique values.

As described herein, each of the number of data values from a data set can include a plurality of values. For example, as described herein, each data value can include an X-value and a Y-value. In additional examples, the data values from the data set can include more or less values associated with each data value.

The graphical representation can include a representation of multiple input values (e.g., X-value and Y-value, etc.) and include polygon constraints for the multiple input values. For example, the polygon constraints can place constraints on input values to represent a quantity of unique values within each of the polygon constraints. In one example, a polygon constraint 458 can include values with an X-value that is less than or equal to (4) and Y-value that is less than or equal to (2). In another example, a polygon constraint A 460 can include values with an X-value that is less than or equal to (2) and a Y-value that is greater than (2). The number of polygon constraints can be utilized to visualize a quantity of unique values for each constraint.

The graphical representation can be utilized to determine if a quantity of unique values within a particular polygon constraint is within a particular threshold (e.g., between a determined minimum and maximum quantity of unique values, etc.). There can be a determination of the quantity of unique values within each polygon constraint. A threshold value can be assigned to each polygon constraint and the determined quantity can be compared to the assigned threshold value.

A number of values can be added to the multi-dimensional tree when a number of unique values are below the assigned threshold for a particular polygon constraint. For example, if the polygon constraint A 460 is below an assigned threshold for a quantity of unique values, a number of unique values that would be within the polygon constraint A 460 (e.g., (4,1), (6, 1), (8,1), etc.) can be added to the multi-dimensional tree utilizing a binary decision chart (e.g., binary decision chart 330 as referenced in FIG. 3, etc.) as described herein. Adding to the number of unique values for a particular polygon constraint can increase an accuracy (e.g., similarity to a multi-dimensional tree generated by utilizing all of the data values within a data set, etc.) of the multi-dimensional tree that was generated utilizing a sample set of data. That is, the multi-dimensional tree that is generated utilizing the sample set of data from a data set can better represent a multi-dimensional tree that is formed from the data set without having to generate a multi-dimensional tree from the entire data set.

A number of nodes can be split within the multi-dimensional tree when the number of unique values is above the assigned threshold for a particular polygon constraint. For example, if the polygon constraint 458 includes a number of unique values that are above the threshold a number of nodes within the multi-dimensional tree can be split and a number of nodes can be constructed under each of the number of split nodes, By splitting a number of nodes within the multi-dimensional tree, the number of unique values within the polygon constraint 458 can be within the threshold and the multi-dimensional tree can better represent the entire data set as described herein.

Figure 5:
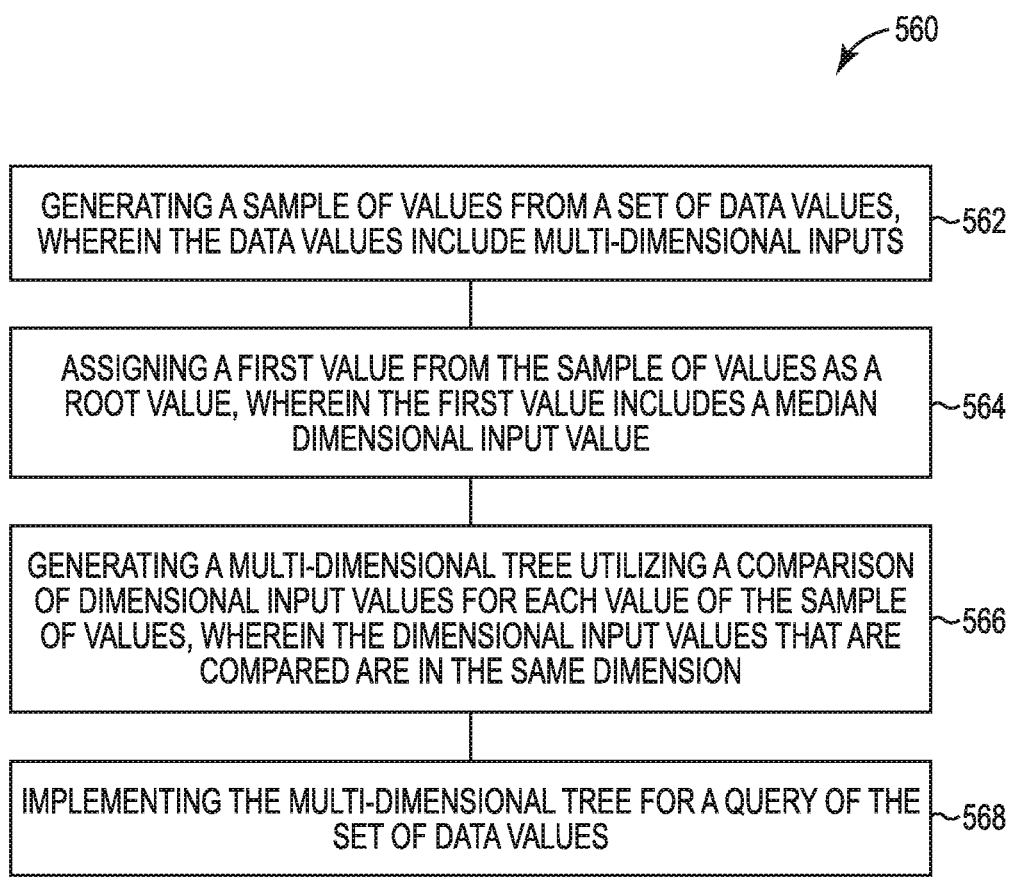
FIG. 5 is a flow chart of an example of a method for multi-column statistic generation of a multi-dimensional tree according to the present disclosure.

FIG. 5 is a flow chart of an example of a method 560 for multi-column statistic generation according to the present disclosure. As described herein, the multi-column statistic generation of a multi-dimensional tree can provide a representation of a data set (e.g., set of data values, database with data values, etc.) that can be implemented to query the data set without having to utilize all the data values within the data set. In addition, each of the input values can be considered without assuming that there is only a single input value representation.

At 562 the method 560 can include generating a sample of values from a set of data values, wherein the data values include multi-dimensional inputs (e.g., (X,Y), (X,Y,Z), etc.). The sample of values from the set of data values can include a portion of data values from the set of data values. That is, the set of data values can include a relatively large number of data values and the sample of values can be a portion of the set of data values. In some embodiments, the sample of values can be a random sampling of values from the set of data values. The sample of values from the set of data values can be utilized to represent the set of data values.

At 564 the method 560 can include assigning a first value from the sample of values as a root value, wherein the first value includes a median dimensional input value. As described herein, a value from the sample of values can be selected and assigned as a root value for the multi-dimensional tree. In some embodiments, a median dimensional input value (e.g., input value, metric value, etc.) can be selected as the root value to balance the multi-dimensional tree.

At 566 the method 560 can include generating a multi-dimensional tree utilizing a comparison of dimensional input values for each value of the sample of values, wherein the dimensional input values that are compared are in the same dimension. As described herein, the multi-dimensional tree can be generated by comparing an input value (e.g., X-value, Y-value, etc.) for each of the number of values within the sample set of values. A binary decision chart (e.g., binary decision chart 330 as referenced in FIG. 3, etc.) can be utilized to determine a location within the multi-dimensional tree based on the comparison of the input values.

At 568 the method 560 can include implementing the multi-dimensional tree for a query of the set of data values. As described herein, the multi-dimensional tree can be implemented to represent the set of data values. For example, the multi-dimensional tree can be implemented in future search queries of the set of data values.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system for multi-column statistic generation of a multi-dimensional tree in a computing device, comprising:
   a sampling engine to:
      obtain a portion of data values from a set of data values, the portion representing a sample set; and
      identify multi-dimensional inputs for each data value in the sample set, each multi-dimensional input corresponding to a feature of the each data value, wherein the multi-dimensional inputs for each data value in the sample set include a first feature representing a dimension for an X-axis for the multi-dimensional tree and a second feature representing a dimension for a Y-axis for the multi-dimensional tree;
   a generating engine to:
      select a root value from the sample set;
      compare a first multi-dimensional input value for a first data value from the sample set to a root multi-dimensional input value for the root value, the first and root multi-dimensional input values corresponding based on a same feature;
      compare a second multi-dimensional input value for a second data value from the sample set to the first multi-dimensional input value and the root multi-dimensional input value, the second multi-dimensional input value corresponding to the same feature;
      determine locations for nodes of the first data value and the second data value to generate the multi-dimensional tree utilizing relative positioning of the nodes based on compared multi-dimensional input values;
      repeat comparison for multi-dimensional inputs associated with all remaining values from the sample set; and
      determine locations for each remaining value to generate the multi-dimensional tree utilizing relative positioning based on compared multi-dimensional input values;
   a filtering engine to determine a number of unique data values at each of the nodes of the multi-dimensional tree utilizing the filter for the sample set; and
   an implementing engine to implement the generated multi-dimensional tree to generate a first graphical representation to be utilized for a future query of the set of data values on the computing device.

2. The system of claim 1, including the generating engine to generate the multi-dimensional tree by placing each data value from the sample set in a location of an associated node in the multi-dimensional tree, the association of the each data value to the location based on a comparison with other multi-dimensional input values used to generate the multi-dimensional tree.

3. The system of claim 1, including the filtering engine to determine the number of unique data values at each of the nodes of the multi-dimensional tree from a first direction of a respective node and the number of unique data values from a second direction of the respective node within the multi-dimensional tree.

4. The system of claim 1, comprising a graphical engine to generate a second graphical representation indicating the number of unique data values from the sample set.

5. The system of claim 4, wherein the second graphical representation includes a number of polygons that are defined by a traversal of the multi-dimensional tree from the root value.

6. A non-transitory computer readable medium storing instructions executable by a processing resource to cause a computer to:
   obtain a portion of data values from a set of data values, the portion representing a sample set;
   identify multi-dimensional inputs for each data value in the sample set, each multi-dimensional input corresponding to a feature of the each data value, wherein the multi-dimensional inputs for each data value in the sample set include a first feature representing a dimension for an X-axis for the multi-dimensional tree and a second feature representing a dimension for a Y-axis for the multi-dimensional tree;
   assign a first value from the sample set as a root value;
   compare a first multi-dimensional input value to a root multi-dimensional input value for the root value, the first and root multi-dimensional input values corresponding based on a same feature;
   compare a second multi-dimensional input value for a second data value from the sample set to the first multi-dimensional input value and the root multi-dimensional input value, the second multi-dimensional input value corresponding to the same feature;
   determine relative locations for each node of the multi-dimensional tree utilizing comparisons of corresponding multi-dimensional input values for each respective node;
   generate the multi-dimensional tree utilizing the determined relative locations;
   repeat comparison for multi-dimensional inputs associated with all remaining values from the sample set;
   determine locations for each remaining value to generate the multi-dimensional tree utilizing relative positioning based on compared multi-dimensional input values; and
   implement the generated multi-dimensional tree on a computing device by assigning a number of unique data values to nodes determined using associated multi-dimensional input values, the generated multi-dimensional tree for a future query of the set of data values.

7. The medium of claim 6, wherein the instructions are executable to place the second data value as a child node of the first data value, the child node in a first direction if the compared multi-dimensional input for the second value is less than or equal to the multi-dimensional input of the first value used for comparison.

8. The medium of claim 7, wherein the instructions are executable to place the second data value as a child node of the first data value in a second direction opposite the first direction if the compared multi-dimensional input for the second value is greater than the multi-dimensional input of the first value used for comparison.

9. The medium of claim 6, wherein the instructions are executable to cause a computing device to generate a number of hard counters and soft counters into the multi-dimensional tree.

10. A method for multi-column statistic generation of a multi-dimensional tree, comprising:
- obtaining a portion of data values from a set of data values, the portion representing a sample set; and
- identifying multi-dimensional inputs for each data value in the sample set, each multi-dimensional input corresponding to a feature of the each data value, wherein the multi-dimensional inputs for each data value in the sample set include a first feature representing a dimension for an X-axis for the multi-dimensional tree and a second feature representing a dimension for a Y-axis for the multi-dimensional tree;
- assigning a first value from the sample set as a root value, wherein the first value includes a median multi-dimensional input value relative to multi-dimensional input values across the sample set;
- comparing a first multi-dimensional input value to the median multi-dimensional input value for the root value, the first and root multi-dimensional input values corresponding based on a same feature;
- comparing a second multi-dimensional input value for a second data value from the sample set to the first multi-dimensional input value and the root multi-dimensional input value, the second multi-dimensional input value corresponding to the same feature;
- determining relative locations for each node of the multi-dimensional tree utilizing comparisons of corresponding multi-dimensional input values for each respective node;
- generating the multi-dimensional tree utilizing the determined relative locations;
- repeating comparison for multi-dimensional inputs associated with all remaining values from the sample set;
- determining locations for each remaining value to generate the multi-dimensional tree utilizing relative positioning based on compared multi-dimensional input values; and
- implementing the generated multi-dimensional tree on a computing device by assigning a number of unique data values to nodes determined using associated multi-dimensional input values, the generated multi-dimensional tree for a future query of the set of data values.

11. The method of claim 10, comprising filtering the multi-dimensional tree utilizing a Bloom filter per node of the multi-dimensional tree to determine a number of unique values.

12. The method of claim 11, comprising placing additional unique values in the multi-dimensional tree for the left child and the right child of a given node of the multi-dimensional tree.

13. The method of claim 11, comprising categorizing the number of unique values by a number of constraints.

* * * * *